United States Patent [19]
Johnson

[11] 3,921,852
[45] Nov. 25, 1975

[54] PRECISION SEED PLANTER

[76] Inventor: Lloyd A. Johnson, 3351 N. Raymond, Pasadena, Calif. 91001

[22] Filed: Feb. 21, 1974

[21] Appl. No.: 444,475

[52] U.S. Cl. .............................................. 221/266
[51] Int. Cl.² .......................................... A01C 7/12
[58] Field of Search ...... 221/264, 265, 266; 111/77; 222/177

[56] References Cited
UNITED STATES PATENTS

| | | | |
|---|---|---|---|
| 2,509,069 | 5/1950 | Mrachek | 221/266 X |
| 2,855,125 | 10/1958 | Grimsbo | 221/266 |
| 2,871,805 | 2/1959 | Behnen | 221/266 X |
| 3,392,884 | 7/1968 | Waldrum | 222/177 |

FOREIGN PATENTS OR APPLICATIONS

| | | | |
|---|---|---|---|
| 1,025,371 | 1/1953 | France | 221/266 |
| 96,906 | 5/1924 | Austria | 221/266 |
| 247,754 | 11/1969 | U.S.S.R. | 221/266 |

Primary Examiner—Robert B. Reeves
Assistant Examiner—John P. Shannon
Attorney, Agent, or Firm—Christie, Parker & Hale

[57] ABSTRACT

A rotating feed wheel has shallow seed carrying pockets spaced at intervals along its periphery. A seed loading chamber communicates with the periphery of the feed wheel. An exit for discharge of seeds is located adjacent to the ground. A seed retaining member has an annular surface closely girding the periphery of the feed wheel from the loading chamber to the exit. The feed wheel is part of a seed feeding assembly received by a driving assembly having an endless power transmitting chain with an exposed side. The feeding assembly is removably secured to the driving assembly such that a sprocket associated with the feed wheel engages the outside of the chain along its exposed side, and the feeding assembly rests in a cavity of the driving assembly. A control wheel that rolls along the ground is mounted on an axle with a sprocket. The axle rides in slots to permit adjustment of the sprocket position to engage a power transmitting chain. A passage through a furrow opener supplies water under pressure to the bottom of the furrow in advance of the feed wheel.

15 Claims, 9 Drawing Figures

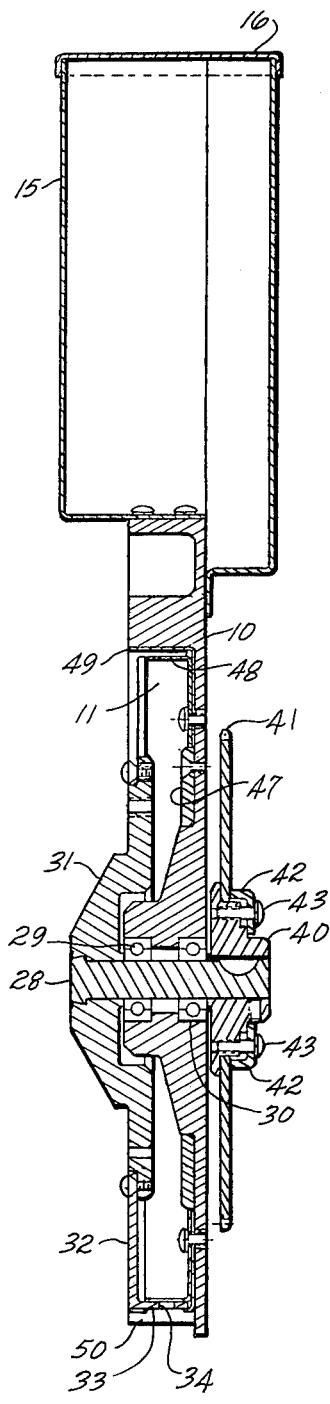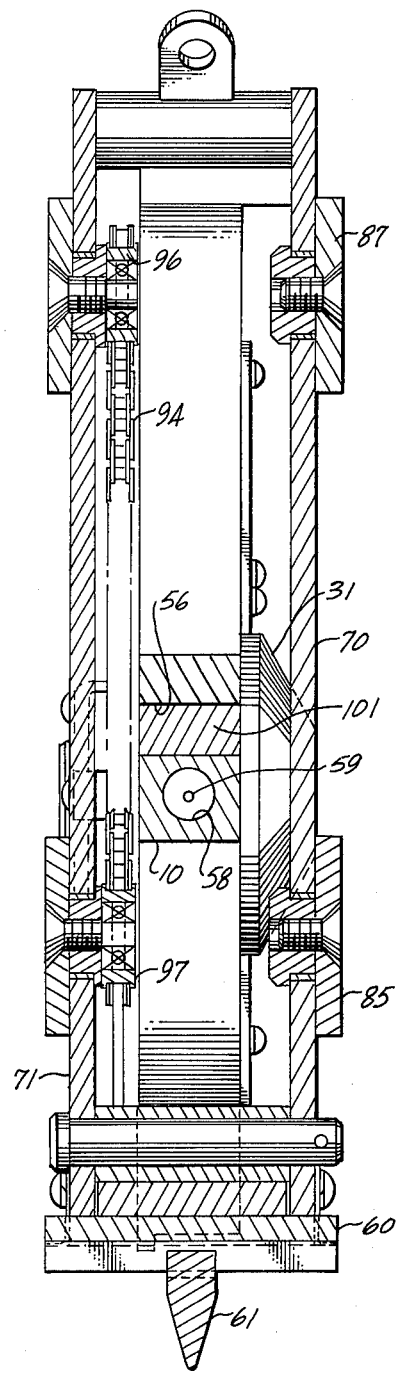

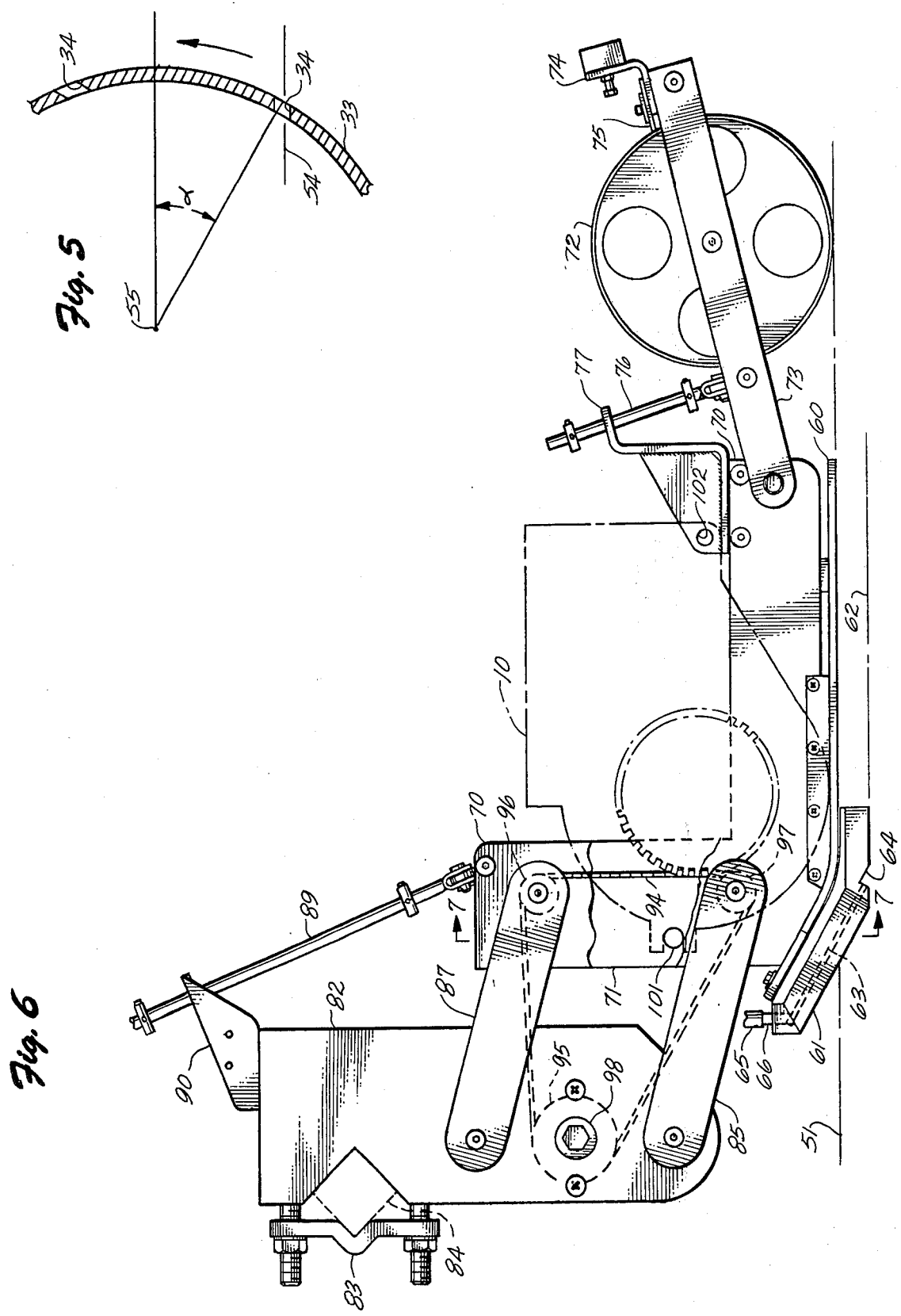

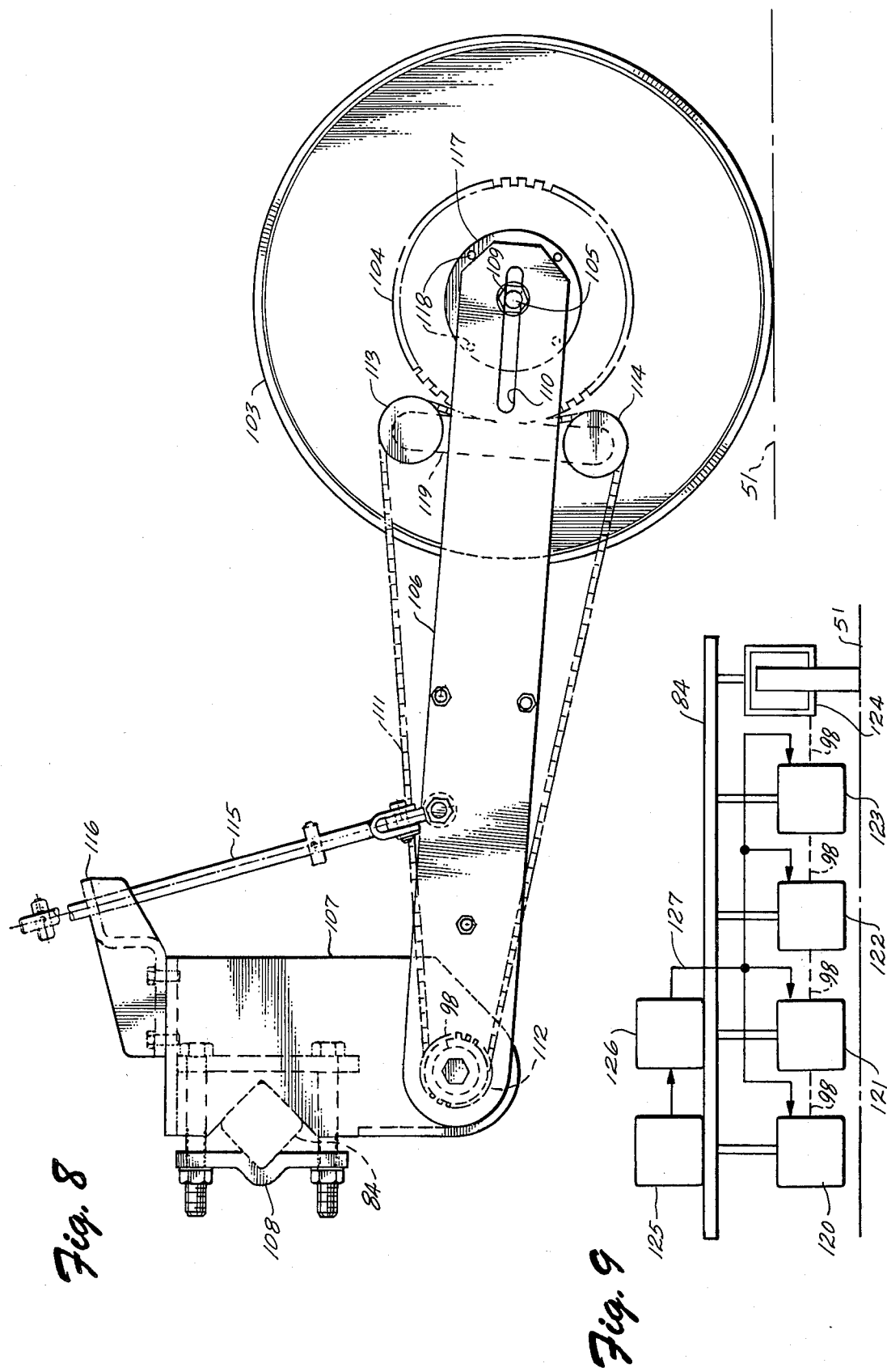

PRECISION SEED PLANTER

BACKGROUND OF THE INVENTION

This invention relates to agricultural equipment and, more particularly, to a precision seed planter.

It is a well established fact that seeds planted at sufficiently spaced intervals produce a crop of higher and more uniform quality and also result in a greater yield than uncontrolled seeding. Some of the commercially available seed planters that distribute seeds at intervals are not well suited for delivering the seeds individually. For example, Jennings et al U.S. Pat. No. 3,320,909 deposits a group of seeds on the ground each time a control wheel passes through a given angular displacement. Seed planters that have been able to distribute seeds individually on the ground tend to become easily clogged. To prevent clogging of the seed delivery passages the prior art has resorted to pneumatic systems, such as that disclosed in Bramblett U.S. Pat. No. 2,783,918, which introduces substantial complexity into the equipment.

SUMMARY OF THE INVENTION

According to one aspect of the invention, a rotatable feed wheel has shallow seed carrying pockets spaced at intervals along its periphery. A seed loading chamber communicates with the periphery of the feed wheel. As the feed wheel rotates through the chamber, the seeds are individually loaded into the respective pockets. An exit for discharge of seeds from the pockets is located at a point adjacent to the ground. A seed retaining member having an annular surface closely girding the periphery of the feed wheel from the loading chamber to the exit retains the seeds in their respective pockets as they are carried by the feed wheel to the exit.

According to another aspect of the invention, a feed wheel is incorporated into a seed feeding assembly that is received in a cavity of a driving assembly. The driving assembly has a power transmitting chain exposed to the cavity on one side of its path. The feeding assembly is removably secured in the cavity of the driving assembly where a sprocket wheel associated with the feed wheel engages the outside of the chain.

According to another aspect of the invention, a control wheel and an associated sprocket wheel are mounted for rotation on an axle. The axle rides in slots which permits the sprocket to engage and disengage from a power transmitting chain and permits the control wheel to roll along the ground as the equipment including the feed wheel moves. By employing sprocket wheels with different diameters, the interval between the seed deposits is controlled; the position of the axle in the slots is adjusted accordingly to maintain engagement with the chain.

According to another aspect of the invention, a passage in a furrow opener associated with the seed planter supplies water under pressure to the bottom of the furrow in advance of the seeds to be planted. The spacing between the point of injection of the water and the point of seed deposit and the water pressure are sufficiently large that the water penetrates into the ground prior to seed deposit.

BRIEF DESCRIPTION OF THE DRAWINGS

The features of the specific embodiments of the best mode contemplated of carrying out the invention are illustrated in the drawings, in which:

FIG. 2 is a sectional view of the seed feeding assembly taken through line 2—2 in FIG. 1;

FIG. 5 is a side sectional view a portion of the feed wheel of the seed feeding assembly illustrating the orientation of the seed pockets;

FIG. 6 is a side sectional view of a driving assembly incorporating the principles of the invention;

FIG. 7 is a sectional view of the seed feeding assembly and the driving assembly together taken through lines 4—4 in FIGS. 1 and 6;

FIG. 8 is a side elevation view of a control wheel assembly employing the principles of the invention; and FIG. 9 is a schematic diagram of a precision seed planting system incorporating a plurality of seed feeding and driving assemblies of FIGS. 1 and 6, and a single control wheel assembly of FIG. 8.

DETAILED DESCRIPTION OF THE SPECIFIC EMBODIMENTS

Figure 1:
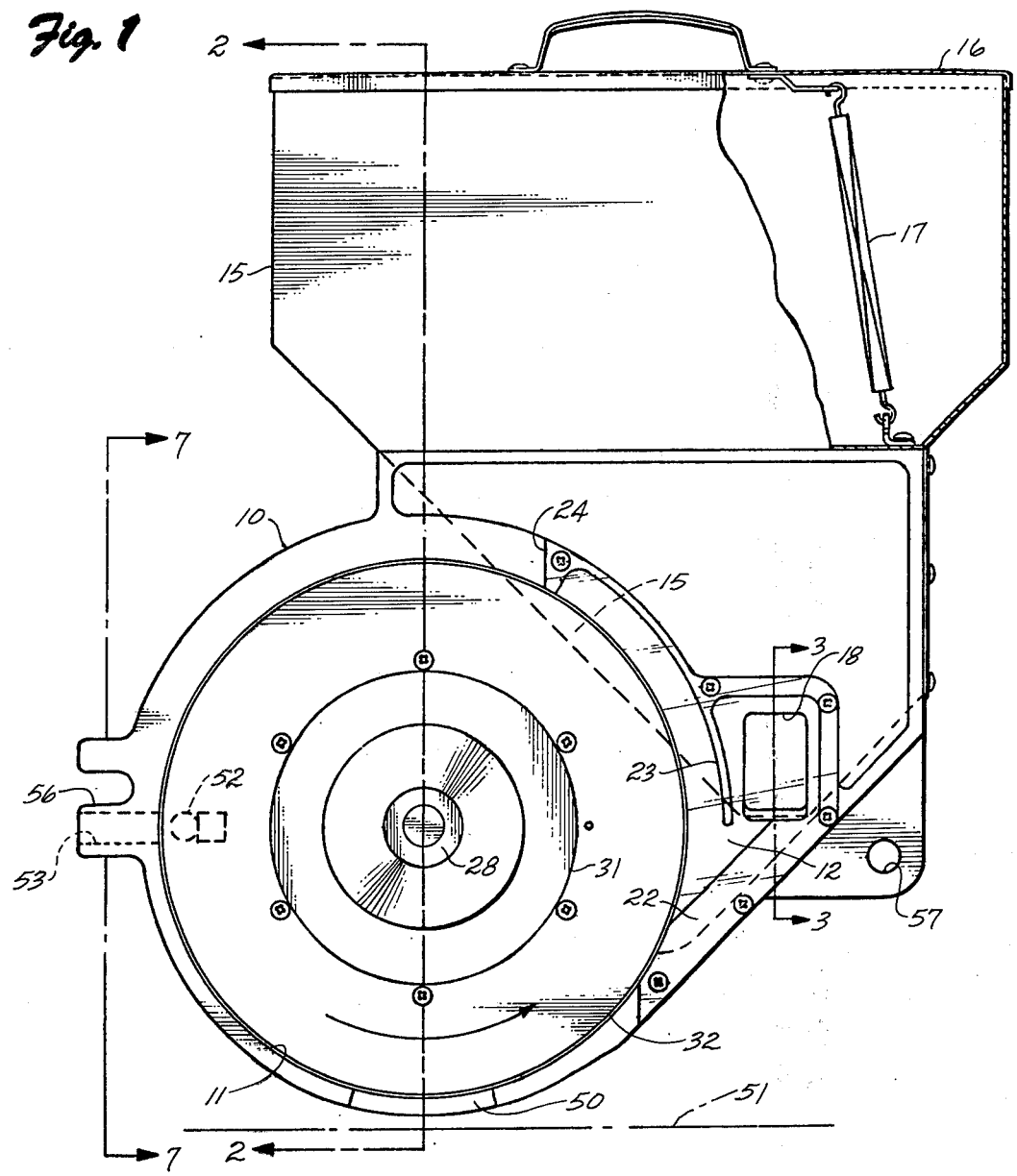
FIG. 1 is a side elevation view of a seed feeding assembly incorporating the principles of the invention.
Figure 3:
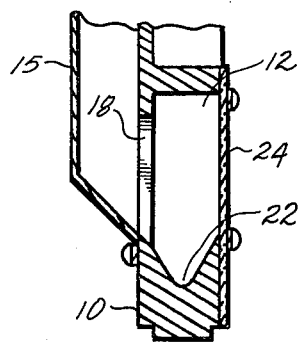
FIG. 3 is a sectional view of a portion of the seed feeding assembly taken through line 3—3 in FIG. 1.

Reference is made to FIGS. 1, 2 and 3, which depict a seed feeding assembly. A housing 10 has a circular feed wheel cavity 11 and a seed loading cavity 12 in communication with a portion of the periphery of cavity 11. A seed storage hopper 15 is secured to the top of housing 10. Hopper 15 has a lid 16 held in place by a spring 17. As viewed in FIG. 2, the left side of hopper 15 has a flat bottom that lies on top of housing 10, and the right side of hopper 15 has a sloping bottom that extends downward to a point adjacent to cavity 12 where an opening 18 in housing 10 couples hopper 15 to cavity 12. The bottom of cavity 12 has a sloping V-shaped trough 22 that extends downwardly from opening 18 to the periphery of cavity 11. Housing 10 has a baffle 23 that isolates opening 18 from the directly adjacent portion of cavity 11. A transparent plate 24 covers the open side of cavity 12. One end of housing 10 has a slot 56, and the other end of housing 10 has a hole 57 for securing the feeding assembly to the driving assembly.

A shaft 28 is journaled for rotation relative to housing 10 by bearings 29 and 30. A hub 31 is fixed to shaft 28 at one end of shaft 28 and an annular feed wheel 32 is secured to the outer perimeter of hub 31. At its outer periphery feed wheel 32 has a flange 33 along which seed carrying pockets, such as that designated 34 (FIG.2) are formed. A hub 40 is fixed on the other end of shaft 28. A sprocket wheel 41 is secured to hub 40 by conventional sprocket clamps 42 and screws 43. A pilot ring 47 is secured to housing 10 within cavity 11. Ring 47 serves to center an inner flanged ring 48 and an outer flanged ring 49, which are also secured to housing 10 within cavity 11. The flanged portion of ring 48 lies inside flange 33, and the flanged portion of ring 49 lies outside flange 33. The clearance between flange 33 and the flanged portions of rings 48 and 49 is as small as possible consistent with free unimpeded rotation of feed wheel 32. Adjacent to the ground represented by a line 51 and exit 50 is formed by an opening at the bottom of housing 10 in alignment with an opening at the bottom of the flanged portion of ring 49.

As the seed feeding assembly moves along the ground, sprocket wheel 41 is turned by the driving assembly described below, and feed wheel 32 rotates in a counterclockwise direction, as viewed in FIG. 1. Under force of gravity, seeds stored in hopper 15 pass through opening 18 and enter cavity 12, which serves as a seed loading chamber. Baffle 23 prevents the level of the seeds in the portion of cavity 12 directly adjacent to the periphery of feed wheel 32 from rising appreciably above the bottom of opening 18. The seeds in cavity 12 are funneled by groove 22 toward the seed carrying pockets in flange 33 where such pockets enter the bottom of cavity 12 during rotation of feed wheel 32. The seed carrying pockets are dimensioned to receive the particular seed being planted, and the number of seeds to be planted at each point. In general, it will be desired to plant only one seed at each point and the subsequent description will proceed upon this assumption. As feed wheel 32 rotates from the point where it enters cavity 12 toward the level of the seeds, which is determined by the bottom of baffle 23, the seed carrying pockets move slightly toward the seeds stored in cavity 12, i.e., the movement of wheel 32 has a horizontal component. As a result, feed wheel 32 scoops one of the seeds up into each pocket. As the pockets pass above the level of the seeds at the bottom of baffle 23, the seeds outside the pockets drop back down. Thus, the ony seeds between baffle 23 and the point where feed wheel 32 exits from cavity 12 are those lying in the seed carrying pockets. These are retained in the seed carrying pockets by inner and outer rings 48 and 49 until the pockets have rotated to exit 50, at which time the seeds fall out of the respective pockets to the ground.

In the perferred embodiment of the invention as depicted in FIG. 1, cavity 12 has an arcuate section directly adjacent to the periphery of wheel 32 and a seed storage section spaced from the periphery of wheel 32 approximately midway between the ends of the arcuate section. Baffle 23 divides these sections. The arcuate section extends from a point approximately 60° beyond exity 50 to a point approximately 150° beyond exit 50 in the rotational path of feed wheel 32. Baffle 23 and opening 18 extend from a point approximately 90° beyond exit 50 to a point approximately 120° beyond exit 50 in the rotational path of feed wheel 32.

The seed carrying pockets can be formed along flange 33 at any desired spacing. In a typical example, if feed wheel 32 has an 8 inch outer diameter, the spacing of the seed carrying pockets is 5° apart. Reference is made to FIG. 5 for a detailed description of the seed carrying pockets. As there depicted, pockets 34 are holes drilled or formed in flange 33 along an axis 54 spaced from the center of rotation 55 of feed wheel 32 and slanted in the direction of rotation. In the preferred embodiment, the slant angle $\alpha$ is 30°. By forming the seed carrying pockets in this manner, the pockets have straight sides and the seeds are held in the pockets by the upperly sloping side surfaces of the pockets after the pockets have rotated beyond the seed level, i.e., beyond the bottom of baffle 23. It should be noted that the depth of the pockets is uniform, which is represented in FIG. 5 by the fact that the pockets appear as parallelograms. This feature is important because it prevents plural seeds from entering a pocket and eventually being planted together which is usually regarded as an undersirable result in precision seed planting. In contrast, if the seed carrying pockets were slanted holes drilled into a solid feed wheel rather than through a thin flange, the pockets would be deeper on one side than the other and the seed position in a pocket would not be sufficiently definite; some seed positions would permit two or more seeds to occupy the pocket, i.e., where the pocket is deepest. In some embodiments, the seed carrying pockets are circular, and in others, oblong, depending upon the shape of the seeds to be planted. In any case, the pockets are cylindrical in that their sides are a surface generated by a straight line (generatrix) moving parallel to a fixed straight line and intersecting a fixed curved line. In the case of any non-spherical seed, the object is to design the pockets so a seed can only fit therein with one orientation. If the seeds are flat, the pockets are dimensioned to permit the flat surfaces of the seeds to lie in the pockets parallel to the periphery of feed wheel 32.

Figure 4:
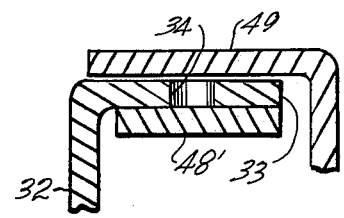
FIG. 4 is a sectional view of an alternative embodiment to that shown in FIG. 2.

FIG. 4 depicts a modification of the seed feeding assembly in which the inner ring, represented by 48' is fixed to rotate with the inner surface of flange 33, rather than being stationary as depicted in FIG. 2. This arrangement is found necessary in order to prevent some pointed seeds, such as tomato seeds, from wedging between flange 33 and the inner ring. In FIG. 4, inner ring 48' serves as a bottom to the seed carrying pockets.

The described seed feeding assembly distributes individual seeds at precisely determined intervals in a reliable manner. Double seeding, i.e., two seeds being planted at the same point, is very rare with the described assembly because of the shape of the seed carrying pockets and the reliable mechanical conveyor for transporting the seeds from the storage hopper to the ground. Skip seeding, i.e., missing a seed at a point where one should be planted, occurs at a rate of about 3% or less. The assembly has little tendency for seeds to jam, clog, or block the free flow of individual, precisely spaced seeds from the storage hopper to the ground. To detect such a condition when it does occur, a lamp 52 and a photocell 53 are arranged on opposite sides of flange 33 approximately 90° before exit 50 in the rotational path of feed wheel 32. Photocell 53 is mounted in a cavity 58 formed in housing 10 and lamp 52 is mounted in cavity 11 by means not shown. A small hole such as that designated 59 in FIG. 7 is formed in each of rings 48 and 49 in alignment with lamp 52 and photocell 53 to couple light from lamp 52 to photocell 53 when no seed occupies one of pockets 34. (In FIG. 7, cavity 58 is shown without photocell 53 for the purpose of illustrating hole 59.) An alarm, not shown, is electrically connected to photocell 53. The alarm is actuated when a plurality of light pulses are received by photocell 53 in a given period of time, which alerts the operator the free flow of seeds is blocked.

Reference is made to FIGS. 6 and 7, which depict the driving assembly. A support ski 60 slides along the gound, represented by line 51. A knife-edged furrow opener 61 is secured to support ski 60 so as to lie partially below the ground level. As support ski 60 moves along the ground from right to left, as viewed in FIG. 6, opener 61 cuts a furrow, the bottom of which is represented by a line 62. A passage 63 extends through opener 61 from the top to a notch 64 near the front edge of the bottom of opener 61. Water under pressure is supplied by a hose 65, as described below in connection with FIG. 9, through a fitting 66 to passage 63. Notch 64 is sufficiently spaced forward of seed exit 50 of the feeding assembly, and the water pressure is sufficiently high that the water leaving passage 63 penetrates into the soil before the seeds are planted. As a result, the water that is needed for successful planting under some conditions can be provided without floating the seeds out of the precisely determined locations in which they are distributed by the seed feeding assembly. Identical, spaced, parallel frame members 70 and 71 are mounted on ski 60, to define a cavity in which the seed feeding assembly rests. A rotatable wheel 72 is towed behind frame member 70 and 71 by a pair of pivotable connecting arms one of which is designated at 73. As ski 60 slides along the ground, wheel 72 rotates and closes the furrow produced by opener 61. An attaching bracket 74 extends between arms 73 and a scraper 75 mounted on bracket 74 removes soil from wheel 72. A conventional lifter rod 76, which has a universal connection to arms 73, is guided by a hole in a bracket 77 fixed to frame members 70 and 71.

A tool bar mounting bracket 82 has a clamp 83 that secures the driving assembly to a conventional tool bar pulled behind a tractor. The tool bar is represented by a phantom line 84. The ends of a lower pair of spaced connecting arms 85 and 86 are pivotably attached to bracket 82 and frame members 70 and 71, respectively. The ends of a upper pair of spaced connecting arms 87 and 88 are also pivotably attached to bracket 82 and frame members 70 and 71 respectively. A conventional lifter rod 89, which has a universal connection to frame members 70 and 71, is guided by a hole in a bracket 90 attached to bracket 82. A power transmitting chain 94 is suspended in a triangular path by a sprocket wheel 95, represented by a phantom line in FIG. 6, and idler rollers 96 and 97. Sprocket wheel 95 is mounted on a main drive shaft 98, which is journaled for rotation about bracket 82. Main shaft 98 is turned by a control wheel assembly described below. Arms 85, 86, 87 and 88 are parallel to each other and sprocket wheel 95 is located midway between the ends of these arms attached to bracket 82. This geometry insures that the path length of chain 94 does not change as ski 60 moves vertically relative to bracket 82. The portion of the outside of the path of chain 94 between idler rollers 96 and 97 is exposed to the open space between frame members 70 and 71 where the seed feeding assembly rests during operation. The position of housing 10 is represented by a phantom line in FIG. 6, and is illustrated in the sectional view of FIG. 7. Notch 64 in housing 10 engages a rod 101 which extends between frame members 70 and 71, and hole 57 in housing 10 is aligned with holes such as that designated 102 in a pair of spaced web portions of bracket 77 between which housing 10 fits. When holes 102 and 57 are aligned, and slot 56 engages rod 101, sprocket wheel 41 engages chain 94 along the exposed portion of its path, as depicted in FIG. 6. To secure the feeding assembly to the driving assembly, a bolt, not shown, passes through holes 102 and 57.

A number of types of seeds, particularly pelletized seeds, agglomerate if they are exposed to the elements overnight. Therefore, it is frequently desirable to take such seeds indoors at the end of a day of planting. This can be easily done by removing the bolt securing the seed feeding assembly to the driving assembly and taking the feeding assembly en masse to a suitable storage location for the seeds.

Reference is made to FIG. 8, in which a control wheel assembly is depicted. A control wheel 103 having a deep treaded rubber tire to minimize slippage, and a hub 117 are rotatably mounted on an axle 105. A sprocket wheel 104 is secured to hub 117 by conventional screws 118. A pair of spaced support arms, such as that designated 106, are pivotably attached to drive shaft 98, which is journaled to rotate relative to a tool bar bracket 107. The tool bar, represented by phantom line 84, is attached to bracket 107 by a clamp 108. Slots, such as the designated 110, are located at the ends of support arms 106. Axle 105 rides in slots 110 with driving wheel 103 and sprocket wheel 104 lying between arms 106. Axle 105 is adjusted to the proper position in slots 110 where nuts such as that designated 109 are tightened to secure axle 105. An endless power transmitting chain 111 is suspended in a triangular path by a sprocket wheel 112 mounted on shaft 98, and idler roller 113 and 114. Rollers 113 and 114 are rotatably mounted on opposite ends of a support bar 119, which is secured to arm 106. The portion of the chain path between idler rollers 113 and 114 is exposed to sprocket wheel 104. Axle 105 is slid to the left, as viewed in FIG. 8, until sprocket wheel 104 engages chain 111 between idler rollers 113 and 114. A conventional lifter rod 115 has a universal connection the support arms, i.e., 106, and is guided by a hole in a bracket 116 mounted on bracket 107. As tool bar 84 is pulled along the ground by a tractor, control wheel 103 rolls along the ground. Unevenness in the terrain is adjusted for by the pivotable attachment of arms 106 to brackets 107. As control wheel 103 rolls along the ground, sprocket wheel 104 drives chain 111, thereby turning drive shaft 98, which is coupled to the driving assembly.

Thus, the motion of control wheel 103 is directly coupled to feed wheel 32 by chain 111, drive shaft 98 and chain 94. The angular velocity of feed wheel 32 is proportional to the angular velocity of control wheel 103, and the spacing between seeds is precisely controlled. The spacing between seeds can be varied by substituting for feed wheel 32 a feed wheel having a different spacing between seed carrying pockets and/or substituting for sprocket wheel 104 a sprocket wheel having a different diameter. In the latter case, sprocket wheel 104 is removed from hub 117, a new sprocket wheel is secured to hub 117, and axle 105 is adjusted to a new position relative to slots 110 to provide engagement between the new sprocket wheel and chain 111.

FIG. 9 illustrates how a plurality of precision seed planters incorporating the principles of the invention are towed by a single tractor. Reference numerals 120, 121, 122, and 123 each represent a feeding assembly, as illustrated in FIG. 1, and a driving assembly, as illustrated in FIG. 6, attached to tool bar 84, which is pulled by the tractor. Reference number 124 represents a control wheel assembly, as illustrated in FIG. 8, attached to one end of tool bar 84. As depicted by the dashed line, drive shaft 98 extends along the whole transverse length of tool bar 84 to transmit the rotation of control wheel assembly 124 to assemblies 120 through 123. Water from a tank 125 is forced by a pump 126 through a rubber hose system 127 to the furrow opener of each of assemblies 120 through 123. Each of assemblies 120 through 123 plants a row of seeds as the tractor traverses a field. If it is desired to stagger the seeds planted in adjacent rows, this is conveniently accomplished by lossening screws 43 (FIG. 2) to permit feed wheel 32 to rotate relative to sprocket 41 until the seed carrying pockets are appropriately staggered relative to the seed carrying pockets of the feed wheels of the adjacent assemblies. When tool bar 84 is hydraulically lifted at the end of the field, lifter rod 76 supports wheel 72, lifter rod 89 supports ski 60, and lifter rod 115 suports control wheel 103.

The described embodiments of the invention are only considered to be preferred and illustrative of the inventive concept; the scope of the invention is not to be restricted to such embodiments. Various and numerous other arrangements may be devised by one skilled in the art without departing from the spirit and scope of this invention.

What is claimed is:

1. A precision seed planter comprising:
    a feed wheel having a thin peripheral flange, the feed wheel rotating about a horizontal axis;
    shallow seed carrying pockets in the form of holes extending completely through the flange spaced at intervals along the periphery of the feed wheel, the pockets having sides slanted in the direction of rotation;
    a stationary wheel having a peripheral surface directly adjacent the inside of the flange of the feed wheel under the holes to provide a bottom for the pockets;
    a seed loading chamber in communication with the periphery of the feed wheel for loading one or more seeds into each pocket in turn passing the chamber during rotation of the feed wheel;
    a drive wheel in substantially nonslipping contact with the ground;
    means for coupling the drive wheel to the feed wheel to turn the feed wheel at an angular velocity proportional to the angular velocity of the drive wheel;
    an exit for discharge of seeds from the pockets at a point facing the ground during rotation of the feed wheel; and
    a seed retaining member having an annular surface closely girding the outside of the flange of the feed wheel along the path of rotation of the feed wheel from the loading chamber to the exit to retain seeds in the pockets.

2. The seed planter of claim 1, in which the loading chamber is in communication with the periphery of the feed wheel over an extended region approximately 90° beyond the exit in the path of rotation of the feed wheel.

3. The seed planter of claim 2, additionally having a seed hopper located above the loading chamber and a connection from the hopper to the loading chamber to provide a gravity feed for seeds from the hopper to the chamber.

4. The seed planter of claim 3, in which the connection is an opening into the loading chamber and the loading chamber has a top portion in communication with the periphery of the feed wheel above the opening to permit seed fall back.

5. The seed planter of claim 4, in which the loading chamber has a bottom portion below this opening, and a V-shaped trough is formed in the loading chamber between the opening and the point of the bottom portion where the periphery of the feed wheel enters the chamber, the trough being aligned with the pockets in the feed wheel at the entering point.

6. The seed planter of claim 5, in which the loading chamber has an annular section directly adjacent to the periphery of the feed wheel, a seed storage section spaced from the periphery of the feed wheel approximately midway between the ends of the annular section such that the opening feeds into the storage section, and a baffle extending partially between the annular section and the storage section to isolate the opening from the adjacent portion of the annular section.

7. The seed planter of claim 6, in which the annular section extends from a point approximately 60° beyond the exit in the path of rotation of the feed wheel to a point approximately 150° beyond the exit in the path of rotation of the feed wheel.

8. The seed planter of claim 7, in which the baffle extends from a point approximately 90° beyond the exit in the path of rotation of the feed wheel to a point approximately 120° beyond the exit in the path of rotation of the feed wheel.

9. The seed planter of claim 8, in which the opening extends from a point approximately 90° beyond the exit in the path of rotation of the feed wheel to a point approximately 120° beyond the exit in the path of rotation of the feed wheel.

10. The seed planter of claim 1, in which the sides of the pockets are straight.

11. The seed planter of claim 1, in which the pockets are circular holes lying along an axis spaced from the center of rotation of the wheel and slanted in the direction of rotation of the wheel, the pockets each having an entrance at the periphery of the feed wheel and a bottom parallel to the entrance.

12. The seed planter of claim 10, in which the pockets have cylindrical sides and a uniform depth.

13. A precision seed planter comprising:
    a feed wheel having a periphery, the feed wheel rotating about a horizontal axis;
    seed carrying pockets spaced at intervals along the periphery of the feed wheel;
    a seed loading chamber in communication with the periphery of the feed wheel over an extended region located approximately 90° beyond the ground in the path of rotation of the feed wheel for loading one or more seeds into each pocket in turn passing the chamber during rotation of the feed wheel;
    an exit for discharge of seeds from the pockets at a point facing the ground during rotation of the feed wheel;
    a seed retaining member having an annular surface closely girding the periphery of the feed wheel along the path of rotation of the feed wheel from the loading chamber to the exit to retain seeds in the pockets;
    a drive wheel in substantially nonslipping contact with the ground;
    means for coupling the drive wheel to the feed wheel to turn the feed wheel at an angular velocity proportional to the angular velocity of the drive wheel;
    a seed hopper located above the loading chamber;
    an opening coupling the seed hopper to the loading chamber near the top thereof to provide a gravity feed for seeds from the hopper to the loading chamber; and
    a baffle extending from the top of the loading chamber downwardly below the top of the opening adjacent to the feed wheel to prevent the seed level in the region adjacent to the feed wheel from rising as high as the seed level adjacent to the opening.

14. The seed planter of claim 13, additionally comprising an annular space extending from the top of the loading chamber adjacent to the feed wheel in the direction of rotation to permit seeds at the periphery of the feed wheel to fall back into the loading chamber before meeting the annular surface of the seed retaining member.

15. The seed planter of claim 14, in which the baffle extends from the top of the loading chamber downwardly to the bottom of the opening.

* * * * *